Nov. 4, 1930.    A. LENDERINK    1,780,791
FILTER BED
Filed March 8, 1929    3 Sheets-Sheet 1

INVENTOR
Andrew Lenderink
BY
ATTORNEYS

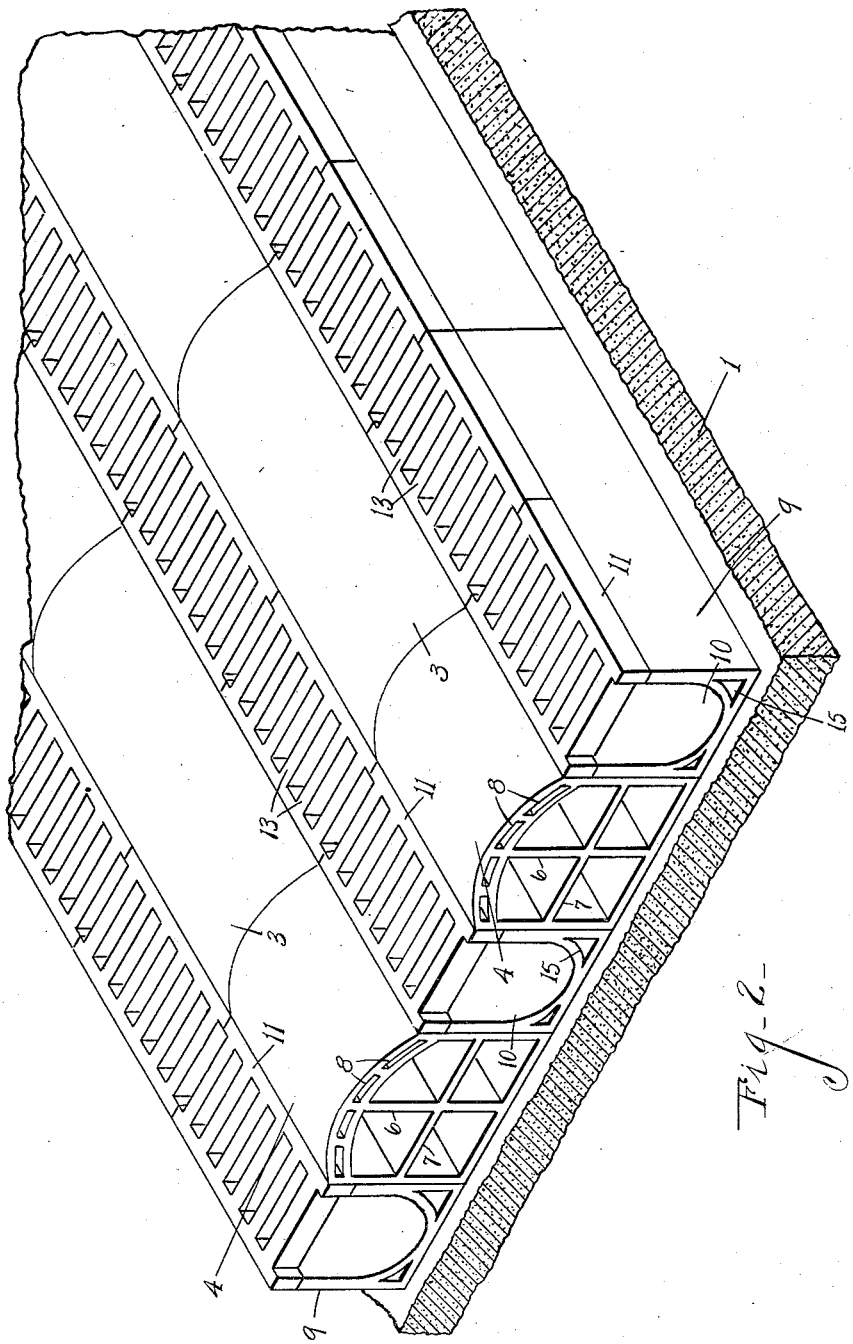

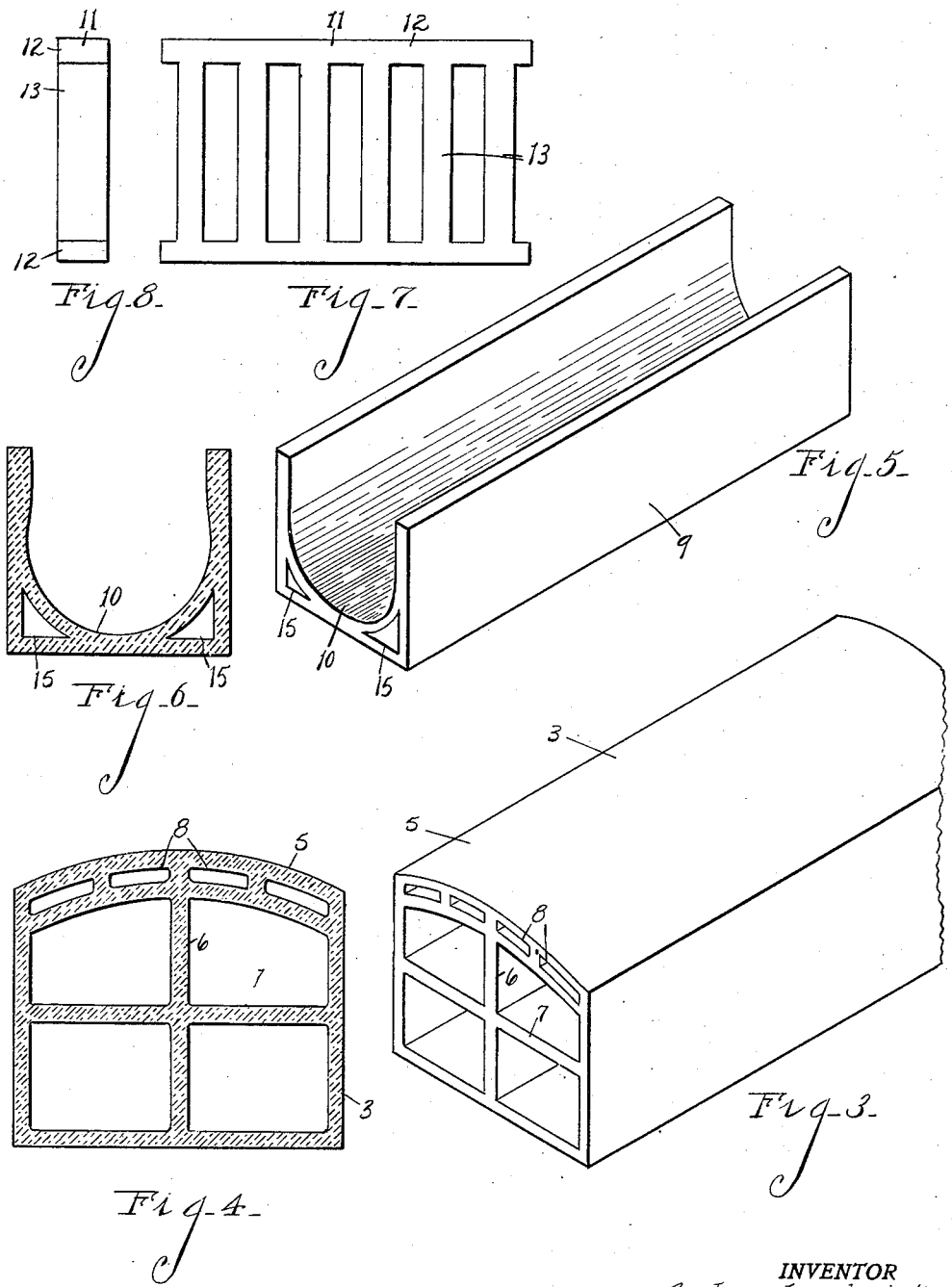

Patented Nov. 4, 1930

1,780,791

UNITED STATES PATENT OFFICE

ANDREW LENDERINK, OF KALAMAZOO, MICHIGAN

FILTER BED

Application filed March 8, 1929. Serial No. 345,291.

The main objects of this invention are:

First, to provide a filter bed for sewage disposal plants and the like which is of large capacity and easily cleaned or flushed.

Second, to provide a filter bed of this character which is economical in its parts, easily installed and at the same time capable of sustaining heavy loads.

Objects pertaining to details and economies of my invention will definitely appear from the description to follow. The invention is defined in the claims.

A structure which embodies the features of my invention is clearly illustrated in the accompanying drawing in which:

Fig. 2 is a fragmentary perspective view with the wall of the filter shown in Fig. 1 omitted illustrating the relation of the several parts of the filter bed.

Fig. 3 is a fragmentary perspective view of one of the bed members.

Fig. 4 is a transverse vertical section through the bed member of Fig. 3.

Fig. 5 is a perspective view of one of the channel or conduit members.

Fig. 6 is a transverse vertical section through the channel member of Fig. 5.

Fig. 7 is a plan view of one of the grid members.

Fig. 8 is an end view of the grid member of Fig. 7.

Figure 1:
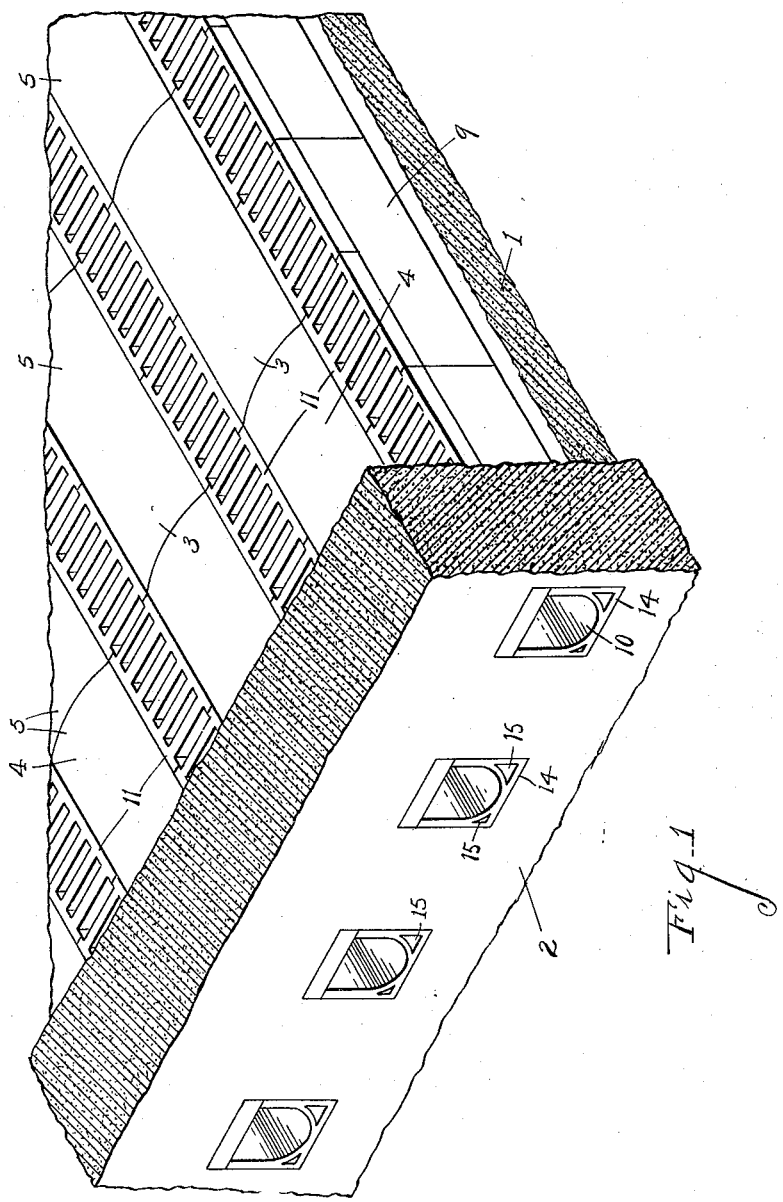
Fig. 1 is a fragmentary perspective view of a filter embodying the features of my invention.

In the accompanying drawing 1 represents a concrete foundation and 2 one of the side walls of a filter embodying my invention. On this foundation I lay a plurality of bed members 3 and 4 arranged in alined rows. These bed members are the same in structure except for variations in length. The tops 5 of these bed members are of arched cross section. The bed members are preferably reinforced by integrally formed vertical and horizontal longitudinally disposed partitions 6 and 7.

The top 5 is provided with curved longitudinal openings 8 which serve to reduce the weight of the members and also to facilitate uniform firing when the bed members are formed of clay as they preferably are. By thus formng the bed members they may be economically formed and fired with a minimum of warpage or distortion and may have comparatively thin walls which are, at the same time, capable of sustaining heavy loads.

Between the rows of these bed members I arrange a series of alined channel members 9. These channel members are open at the top and have curved bottoms 10, the curvature of the bottoms extending well up on the sides of the channels. This eliminates corners in the channel and reduces clogging and makes it very easy to remove any obstruction which may occur by flushing.

Upon these channel members I arrange grid members 11 consisting of side bars 12 and cross bars 13, these cross and side bars being of substantial depth and the thickness of the side bars being subtantially the same as that of the upper edges of the side walls of the channel members. The side bars project beyond the end cross bars so that the end cross bars of adjacent grid members are spaced substantially the same as other cross bars of the grids.

The side bars of the channel members are of such height that when the grids are arranged thereon their faces are in substantially the plane of the upper edges of the side walls of the bed members 3 and 4. The bed members 3 and 4 support the channel members laterally and also support the grid members.

The end members and grid members are arranged through openings 14 provided therefor in the side wall 2 of the filter so that the channels discharge at the outside of the filter and also are accessible for flushing or cleaning.

I have not illustrated the filtering material as it is arranged upon the filter bed and this will be understood by those skilled in the art to which this invention relates.

My improved filter bed is capable of sustaining heavy loads, is of large capacity, that is, admits the passage of a large amount of liquid, is not likely to become clogged, and the channels or conduits may be readily flushed should occasion require. The parts, that is, the bed members, channel members and grid members may be readily formed and fired when formed of earthy material with a minimum of distortion or warpage.

To lighten the channel members and to facilitate firing the channel members are provided with longitudinal openings 15 at the lower corners thereof.

I have not attempted to illustrate or describe various modifications or adaptations which I contemplate as I believe this disclosure will enable those skilled in the art to embody or adapt my improvements as may be desired.

Having thus described my invention what I claim as new and desire to secure by Letters Patent is:

1. In a filter, the combination with a foundation provided with a side wall at one end thereof, a plurality of bed members disposed in alined rows on said foundation and provided with transversely arched top walls, said bed members being provided with integrally formed longitudinally disposed vertical and horizontal partition-like reinforcing elements, a plurality of channel members open at the top arranged in alined rows between said bed members and supported laterally thereby, the bottoms of said channels being transversely curved, the curvature extending a substantial distance into the side walls, and grid members comprising longitudinal side bars and cross bars disposed in spaced parallel relation arranged on said channel bars between said bed members and supported laterally thereby, said side and cross bars being of substantial depth, the faces of the grid members being substantially in the plane of the upper edges of the side walls of the bed members, their side bars being substantially the width of the top edges of the side walls of the channel members, the end channel members and their superimposed grid members being arranged through openings provided therefor in said side wall.

2. In a filter, the combination with a foundation provided with a side wall at one end thereof, a plurality of bed members disposed in alined rows on said foundation and provided with transversely arched top walls, a plurality of channel members open at the top arranged in alined rows between said bed members and supported laterally thereby, the bottoms of said channels being transversely curved, the curvature extending a substantial distance into the side walls, and grid members comprising longitudinal side bars and cross bars disposed in spaced parallel relation arranged on said channel bars between said bed members and supported laterally thereby, the end channel members and their superimposed grid members being arranged through openings provided therefor in said side wall.

3. In a filter, the combination with a foundation provided with a side wall at one end thereof, a plurality of bed members disposed in alined rows on said foundation, a plurality of channel members open at the top arranged in alined rows between said bed members and supported laterally thereby, and grid members comprising longitudinal side bars and cross bars disposed in spaced parallel relation arranged on said channel bars between said bed members and supported laterally thereby, the faces of the grid members being substantially in the plane of the upper edges of the side walls of the bed members, their side bars being substantially the width of the top edges of the side walls of the channel members, the end channel members and their superimposed grid members being arranged through openings provided therefor in said side wall.

4. In a filter, the combination with a foundation provided with a side wall at one end thereof, a plurality of bed members disposed in alined rows on said foundation, a plurality of channel members open at the top arranged in alined rows between said bed members and supported laterally thereby, and grid members comprising longitudinal side bars and cross bars disposed in spaced parallel relation arranged on said channel bars between said bed members and supported laterally thereby, the end channel members and their superimposed grid members being arranged through openings provided therefor in said side wall.

5. In a filter bed, the combination of a plurality of bed members disposed in alined rows and provided with transversely arched top walls, said bed members being provided with integrally formed longitudinally disposed vertical and horizontal partition-like reinforcing elements, a plurality of channel members open at the top arranged in alinged rows between said bed members and supported laterally thereby, the bottoms of said channels being transversely curved, the curvature extending a substantial distance into the side walls, and grid members comprising longitudinal side bars and cross bars disposed in spaced parallel relation arranged on said channel bars between said bed members and supported laterally thereby, said side and cross bars being of substantial depth, the faces of the grid members being substantially in the plane of the upper edges of the side walls of the bed members, their side bars being substantially the width of the top edges of the side walls of the channel members.

6. In a filter bed, the combination of a plurality of bed members disposed in alined rows and provided with transversely arched top walls, said bed members being provided with integrally formed longitudinally disposed vertical and horizontal partition-like reinforcing elements, a plurality of channel members open at the top arranged in alined rows between said bed members and supported laterally thereby, the bottoms of said channels being transversely curved, the curvature extending a substantial distance into the side walls, and grid members comprising longitudinal side bars and cross bars disposed in spaced parallel relation arranged on said channel bars between said bed members and supported laterally thereby.

7. In a filter bed, the combination of a plurality of bed members disposed in alined rows and provided with transversely arched top walls, said bed members being provided with integrally formed longitudinally disposed vertical and horizontal partition-like reinforcing elements, a plurality of channel members open at the top arranged in alined rows between said bed members and supported laterally thereby, and grid members comprising longitudinal side bars and cross bars disposed in spaced parallel relation arranged on said channel bars between said bed members and supported laterally thereby, said side and cross bars being of substantial depth, the faces of the grid members being substantially in the plane of the upper edges of the side walls of the bed members, their side bars being substantially the width of the top edges of the side walls of the channel members.

8. In a filter bed, the combination of a plurality of bed members disposed in alined rows and provided with transversely arched top walls, a plurality of channel members open at the top arranged in alined rows between said bed members and supported laterally thereby, the bottoms of said channels being transversely curved, the curvature extending a substantial distance into the side walls, and grid members comprising longitudinal side bars and cross bars disposed in spaced parallel relation arranged on said channel bars between said bed members and supported lateraly thereby, said side and cross bars being of substantial depth, the faces of the grid members being substantially in the plane of the upper edges of the side walls of the bed members, their side bars being substantially the width of the top edges of the side walls of the channel members.

9. In a filter bed, the combination of a plurality of bed members disposed in alined rows and provided with transversely arched top walls, a plurality of channel members open at the top arranged in alined rows between said bed members and supported laterally thereby, and grid members comprising longitudinal side bars and cross bars disposed in spaced parallel relation arranged on said channel bars between said bed members and supported laterally thereby, said side and cross bars being of substantial depth, the faces of the grid members being substantially in the plane of the upper edges of the side walls of the bed members, their side bars being substantially the width of the top edges of the side walls of the channel members.

In witness whereof I have hereunto set my hand.

ANDREW LENDERINK.